(12) United States Patent
Katchikian

(10) Patent No.: US 7,124,484 B1
(45) Date of Patent: Oct. 24, 2006

(54) METHOD OF MOUNTING PRECIOUS STONES

(76) Inventor: Alex Katchikian, 214 W. 29th St., New York, NY (US) 71001

( * ) Notice: Subject to any disclaimer, the term of this patent is extended or adjusted under 35 U.S.C. 154(b) by 0 days.

(21) Appl. No.: 11/105,723

(22) Filed: Apr. 15, 2005

(51) Int. Cl.
*B23P 5/00* (2006.01)
*A44C 17/02* (2006.01)
*A44C 27/00* (2006.01)

(52) U.S. Cl. ............... 29/10; 63/26; 29/896.4; 29/896.41

(58) Field of Classification Search ............ 29/10, 29/896.4, 896.41; 63/26, 32
See application file for complete search history.

(56) References Cited

U.S. PATENT DOCUMENTS

| | | | | |
|---|---|---|---|---|
| 980,060 A * | 12/1910 | Buser | ............... | 29/10 |
| 1,908,824 A * | 5/1933 | Devendor et al. | ............... | 72/466 |
| 2,140,465 A * | 12/1938 | Bangs | ............... | 29/10 |
| 2,533,870 A * | 12/1950 | Bayer | ............... | 81/7 |
| 2,610,385 A * | 9/1952 | Manne | ............... | 29/10 |
| 3,766,809 A * | 10/1973 | Schneider | ............... | 81/7 |
| 3,839,770 A * | 10/1974 | Favre | ............... | 29/10 |
| 3,911,722 A * | 10/1975 | Levine et al. | ............... | 72/479 |
| 4,648,248 A * | 3/1987 | Raymond | ............... | 63/28 |
| 4,750,245 A * | 6/1988 | Moussouris | ............... | 29/10 |
| 5,271,132 A * | 12/1993 | Pepper et al. | ............... | 29/10 |
| 5,305,506 A * | 4/1994 | Forman | ............... | 29/10 |
| 5,475,710 A * | 12/1995 | Ishizu et al. | ............... | 375/232 |
| 5,475,910 A * | 12/1995 | Yamamoto | ............... | 29/10 |
| 5,806,158 A * | 9/1998 | Wang | ............... | 29/10 |
| 6,253,432 B1 * | 7/2001 | Peters et al. | ............... | 29/10 |

* cited by examiner

*Primary Examiner*—Robert J. Sandy
*Assistant Examiner*—David Reese
(74) *Attorney, Agent, or Firm*—Charles E. Temko

(57) ABSTRACT

A method of mounting precious stones in an article of jewelry, typically an earring, which includes the steps of punching a recess in the article of jewelry which is hollow, positioning the stone in the recess, and heading over the edge of the recess to retain the stone.

2 Claims, 2 Drawing Sheets

METHOD OF MOUNTING PRECIOUS STONES

BACKGROUND OF THE INVENTION

This invention relates generally to the field of jewelry manufacture, and more particularly to an improved method for setting a cut stone in secure engagement within an article of jewelry.

In the prior art, it is known to position in a mold, and cast the article of jewelry around the periphery of the stone. This method results in a heavy solid casting, and additional soldering of an attaching post or ring.

A second known method is to form a hollow casting, and drill a passage corresponding to the diameter of the stone, inserting a hollow tube in the passage, and positioning the stone on the end of the tube prior to heading over the hollow casting. Subsequently, the posts or ring are soldered into position.

SUMMARY OF THE INVENTION

Briefly stated, the disclosed method simplifies the above-described methods. The article of jewelry is formed as a hollow molding or casting without a recess for the stone. This is placed in a retaining die and the recess for the stone is punched into the body thereof using a two-part concentric die. The stone is then pushed into place within the recess, and the periphery of the recess is headed over to retain the stone in position.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Overview

The present method contemplates the provision of a hollow article of jewelry formed of precious metal ranging in thickness from 0.003 to 0.005 inches in thickness, so that it can be readily deformed from the outer surface, in a manner in which the deformed part forms a solid socket for reception of the inner part of the precious metal stone which is most commonly a so-called "diamond cut", in which the inner part is conically shaped to include a number of small facets. Thus, when the stone is mounted in the socket, it is not only supported at the periphery, which is circular, but at various points on the inner surface of the stone, so as to possibly prohibit any relative movement.

Figure 1:
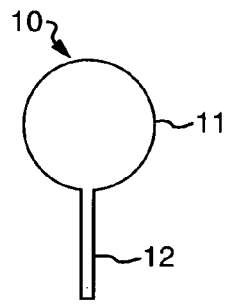
FIG. 1 is a schematic view of a hollow article of jewelry employed in a first step in the disclosed method.
Figure 2:
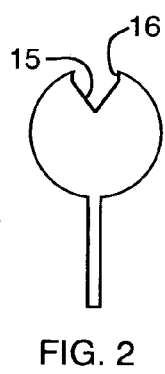
FIG. 2 is a similar schematic view of the article after the forming of a recess for reception of the stone.

FIG. 1 schematically illustrates the commencement of a first step which includes the provision of a hollow spherical article of jewelry generally indicated by reference character 10. It includes a spherical portion 11 and a mounting shaft 12. Referring to FIG. 2, the article is mechanically deformed to form a conically-shaped recess 15 with a cylindrically-shaped border 16 which is ultimately headed over to retain the stone.

Figure 3:
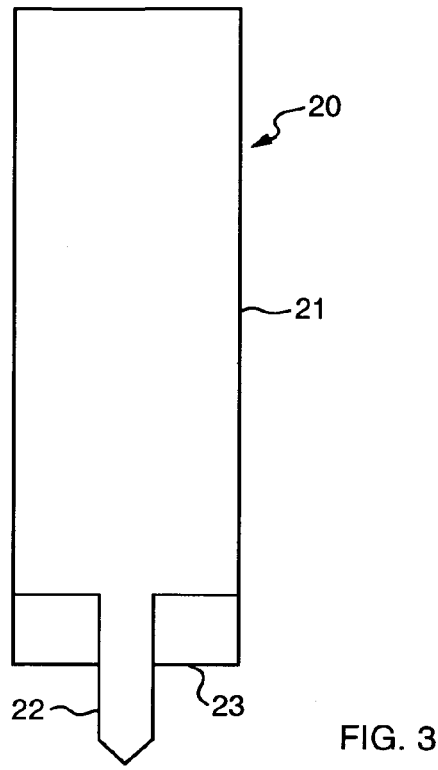
FIG. 3 is a schematic view of a forming tool.
Figure 4:
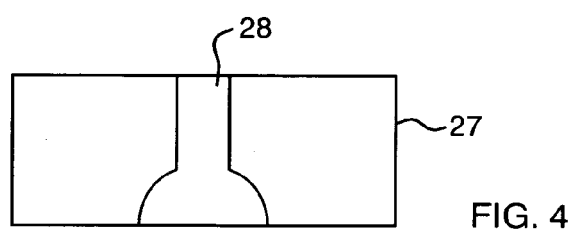
FIG. 4 is a schematic view of an upper die plate.
Figure 5:
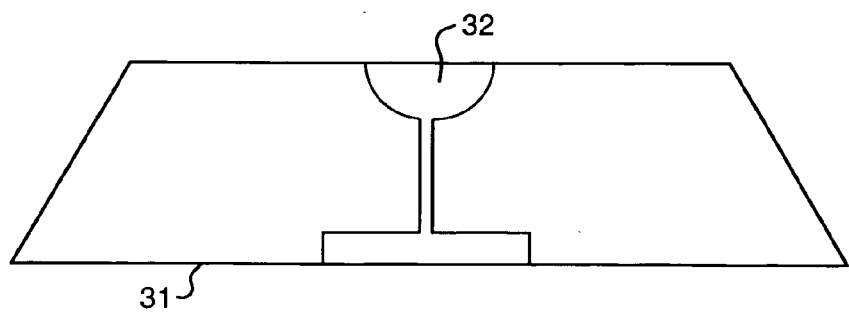
FIG. 5 is a schematic view of a lower die plate.

FIG. 3 shows a forming tool 20, including a punch member 21 which forms the recess, the punch member being surrounded by a rubber pad 23 at the axially extending member 22. FIG. 4 illustrates an upper top plate 27 having a centrally-disposed recess 28 which supports the article 10 during deformation. FIG. 5 illustrates a corresponding lower plate 31 having a corresponding recess 32.

Figure 6:
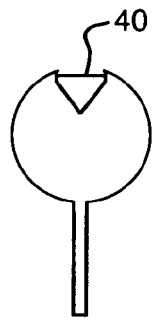
FIG. 6 is a schematic view of the article prior to the commencement of a second step in the disclosed method.
Figure 8:
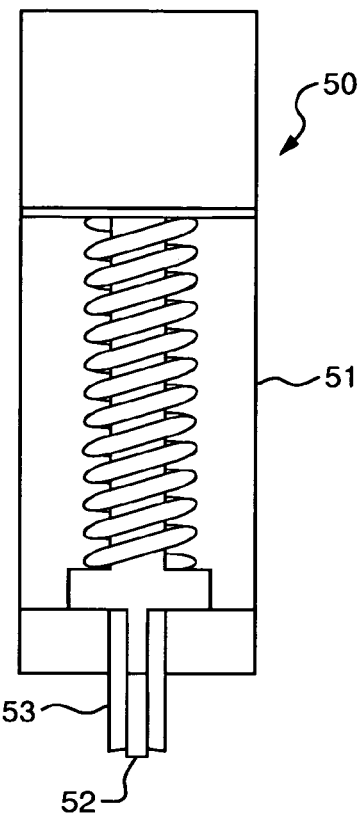
FIG. 8 is a schematic view of a top die plate used in the second step of the method.
Figure 9:
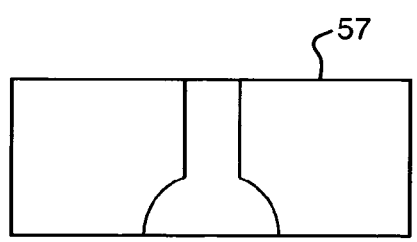
FIG. 9 is a schematic view of a top die plate using in the second step.
Figure 7:
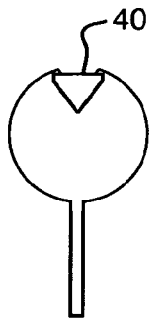
FIG. 7 is a schematic view showing a completed article of jewelry.
Figure 10:
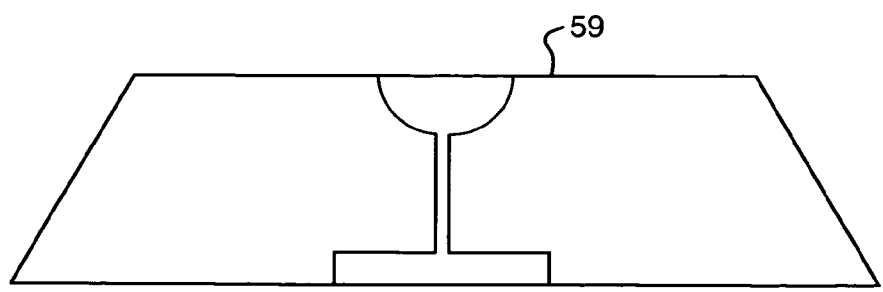
FIG. 10 is a schematic view of a bottom die which cooperates with the top die plate shown in FIG. 9.

The second step in the method includes the seating of the diamond cut stone, generally indicated by reference character 40 (FIG. 6), following which the periphery of the recess is headed over as shown in FIG. 7. FIG. 8 illustrates the wrapping tool 50 which accomplishes the seating and heading over of the stone. It includes a first punch member 51 which surrounds a second spring loaded member 52 which cooperate with a top plate 57 and bottom plate 59 (FIGS. 9 and 10). During assembly, the stone is manually placed within the recess, and the article seating between plates 57 and 59. The wrapping tool 50 is then lowered wherein the spring loaded punch positively seats the stone, and subsequently yields to permit the second punch member 53 to head over the peripheral portion of the recess, following which the article 10 is removed to any subsequent polishing or other operation required.

It may be observed that the metallic part of the article is formed substantially from very thin metal, thus effectively reducing the cost of precious metal material. However, once the stone is installed, it adds additional rigidity to the hollow metal structure through the heading over process, which effectively removes any possibility of the stone becoming loose or lost.

I wish it to be understood that I do not consider the invention to the limited to the details shown and described in the specification, for obvious modifications will occur to those skilled in the art to which the invention pertains.

I claim:

1. The method of making a hollow article of jewelry mounting a precious stone, comprising the steps of:
    a) providing a hollow thin wall metal body of spherical configuration having a radially projecting mounting shaft thereon;
    b) providing a forming tool including a punch member for forming a recess accommodating said stone, and first and second upper and lower plates having centrally-disposed recesses supporting said hollow article during deformation;
    c) providing a finished precious stone of generally arcuate configuration having a conical inner surface portion;
    d) positioning said body between said first and second upper and lower plates to be supported thereby, and deforming an axially-oriented recess in said body to correspond to the conical inner surface of said stone, simultaneously forming a continuous peripheral edge portion and an inwardly-extending conically shaped portion;

e) inserting said inner part of said stone into said recess, and;

f) heading over said continuous peripheral edge portion of said recess to retain said stone within said recess in said metal body.

2. Tool means for forming a hollow article of jewelry mounting a precious stone and having a mounting shaft extending radially therefrom, comprising: a punch member for forming a recess in said hollow article; first and second upper and lower generally planar article-retaining plates, each having corresponding aligned recesses selectively engaging said hollow article, said recesses being aligned with said punch member; whereby said article is positioned between said first and second upper and lower plates during formation of a conically-shaped recess for engaging said precious stone.

* * * * *